United States Patent Office 3,255,079
Patented June 7, 1966

3,255,079
THERAPEUTIC DENTAL CEMENT AND A METHOD FOR TREATING CARIOUS TEETH
André Schroeder, Bern, Switzerland, and Joseph Thomas Powers, Bardonia, N.Y., assignors to American Cyanamid Company, Stamford, Conn., a corporation of Maine
No Drawing. Filed June 17, 1963, Ser. No. 288,547
8 Claims. (Cl. 167—60)

Generally stated, the present invention relates to a therapeutic dental cement and its use in the treatment of carious teeth. In particular, the invention provides an improved zinc oxide type cement containing therapeutically effective quantities of both a tetracycline type antibiotic and a corticosteroid having the characteristics of triamcinolone acetonide. The invention includes the cement composition itself, its use in dental repair, and also an improved dental repair kit containing the cement ingredients in predetermined proportions such that upon admixture the improved therapeutic dental cement will be produced as will hereinafter be more fully described; and a hydrophilic paste composition containing therapeutic quantities of a corticosteroid and an antibiotic.

The present invention is the culmination of a long series of investigations, conducted largely by the inventors and their associates, in the regeneration and repair of carious human teeth. As a result of the investigations, it soon became evident that neither an antibiotic nor a corticosteroid, if used alone, would be sufficient to effectively treat the inflammation and infection resulting from carious teeth, such as pulpitis and periodontitis. It was eventually found, however, that the inflammation and infection resulting from carious teeth could be improved by using the two types of medicaments together providing certain definite proportions and dosages were used. In particular, it was found that the application of a hydrophilic paste containing about 0.1 to 1% of a corticosteroid and about 1.5 to 3% of a tetracycline type antibiotic to a carious tooth would reduce both the inflammation and infection and aid materially in treatment of the tooth, but would not effect a complete therapy since the use of the hydrophilic paste composition is restricted. The restrictive use of the hydrophilic paste arises as a consequence to the fact that the sealing off of a pulp wound with such a preparation for a period in excess of approximately six days will result in necrosis of the tooth, because of the concentration of cortico-steroid released.

The discoveries were then made on which the present invention is based. It was found that the incorporation of a cortico-steroid such as triamcinolone acetonide and a tetracycline antibiotic such as tetracycline itself, demethyltetracycline and demethylchlortetracycline, preferably as the hydrochloride salt, into a set zinc oxide type dental cement, would assist materially in aiding the recovery of a carious tooth. It was found that apparently, the antibiotic and the cortico-steroid would both be released from the set cement composition by its contact with the dentine or pulp of the tooth at approximately equal rates; it was also found that these rates could be such as to provide the proper degree of medication for the tooth.

Therefore, the invention relates to a dental cement, comprising a zinc oxide cement powder having admixed therein from 0.1 to 1% of triamcinolone acetonide and from 1.5 to 3% of a member selected from the group consisting of tetracycline, demethyltetracycline and demethylchlortetracycline, based on the weight of said powder, together with sufficient of a hardening catalyst to form a set cement.

The advent of such a therapeutic dental cement has brought about a number of important innovations in dental repair. Thus, the therapeutic dental cement may be used to line a prepared dental cavity and, after it hardens, the cavity may be permanently filled in the usual manner with a permanent filling of amalgam, gold or any other conventional filling material. The therapeutic dental cement thereby completely supplants the use of the hydrophilic paste composition described above, in treating an unexposed, non-purulent pulp. Not only may the therapeutic dental cement be used in cases where only the pulp is inflammed and the pulp is unexposed, but it can also be applied with success following the treatment of an exposed or partially purulent pulp with the same hydrophilic paste composition hereinabove described. In other words, the disadvantages of the paste treatment are overcome by following this treatment with a final application of the therapeutic dental cement of the present invention.

Therefore, the use of the novel therapeutic dental cement of the instant invention accomplishes an immediate therapeutic response by curbing infection and relieving inflammation and pain without the disadvantage of cortico-steroid necrosis, and in addition provides protection against the recurrence of the inflammation and infection. There is also a regeneration of dentine, as well as the formation of reparative dentine in the pulpar region which is exposed to danger. Moreover, the cement layer at the base of the cavity protects the pulp and nerves from damage caused by permanent metallic or other type fillings superimposed thereon, and thereby diminishes the hypersensitivity of the tooth.

It is known that zinc oxide type dental cements are made up of a cement powder and a hardening catalyst, which are not mixed together until just before the cement composition is to be applied to the tooth. After the hardening agent has been admixed with the powder the resulting cement hardens rapidly, but the two components may be stored separately for long periods of time without deterioration. In preparing the therapeutic dental cements of the present invention the antibiotic and the cortico-steroid are blended with the dry cement powder and the blend is bottled or otherwise packaged and maintained separately from the hardening agent in the usual manner. The dry powder should contain from 0.1 to 1% by weight of triamcinolone acetonide or other equivalent corticosteroid and from about 1.5 to 3% of the tetracycline, demethyltetracycline, demethylchlortetracycline or other comparable antibiotics. The dry powder will ordinarily also contain, in addition to zinc oxide itself, suitable quantities of excipients such as ground balsam, rosin and the like. The hardening agent or catalyst which is bottled or otherwise packaged separately, may be eugenol, or eugenol-like substances either as such or in admixture with minor proportions of rectified oil of turpentine.

An additional feature of the invention resides in the incorporation of suitable quantities of calcium hydroxide into the dental cement composition. It has been found that the replacement of approximately 30–35% of zinc oxide by calcium hydroxide in the dry zinc oxide powder will aid in the regeneration of dentine when the cement is applied thereto. A preferred dry powder representative of this feature of the invention would therefore contain about 52 parts by weight of zinc oxide, 30 parts of calcium hydroxide, 8 parts of ground Canada balsam, and 8 parts of rosin together with about 0.1 to 1 part of triamcinolone acetonide and 1.5 to 3 parts of tetracycline hydrochloride. This powder would be converted into a cement by admixture with a sufficient amount of the hardening catalyst, such as 5 to 20% of eugenol or the rectified oil of turpentine-eugenol mixture. The preferred concentration of the hardening catalyst, based on the weight of the dry cement powder is 7 to 17%. It should be noted that the concentration of the hardening catalyst used is directly proportional to the hardening time of the cement, and may best be defined as that quantity sufficient to form a set cement. Therefore, the concentrations hereinabove set forth are in no way intended to limit the invention, so long as a sufficient quantity is used to form a set cement, and since the concentration used is at the option of the practitioner depending upon the hardening time desired.

The therapeutic dental cement is prepared for application by mixing to a creamy consistency the zinc oxide, cortico-steroid, antibiotic composition with a catalyst or hardening agent such as eugenol immediately before use. A prepared cavity is then lined with the cement and allowed to harden; and the permanent filling is then applied over the hardened cement layer. The amount of therapeutic dental cement used to line a prepared cavity is usually about 100 milligrams containing 1.5 to 3 milligrams of antibiotic and 0.1 to 1 milligram of triamcinolone acetonide. As used in the present specification and claims, the term prepared cavity shall mean a cavity from which all carious dentine has been removed, and which has been pretreated with the hydrophilic paste composition hereinabove described when the pulp is exposed or partially purulent.

The use of the therapeutic dental cement is recommended in the treatment of the inflammation and infection resulting from a carious tooth, the one exception being those conditions of total purulent pulpitis. In cases where the pulp is not exposed subsequent to the removal of all carious dentine, the treatment of serous non-purulent pulpitis can be accomplished with one treatment. The prepared cavity is lined with the cement, which is in a creamy consistency, allowed to harden and the cavity is then permanently filled.

Where the pulp is exposed or purulent, a pretreatment with a hydrophilic paste containing therapeutic quantities of the antibiotic and triamcinolone acetonide is recommended. The hydrophilic paste is applied to the exposed pulp and to the dentine adjacent to the pulp. The cavity is filled with a temporary filling and usually within two or three days removed, along with any excess medication, the prepared cavity is then lined with the therapeutic dental cement, allowed to harden, and then permanently filled. Therefore, one is capable of accomplishing an effective treatment of an exposed pulp or one which is purulent with a maximum of two sittings.

In slight cavities and small areas of pulp exposure, the therapeutic dental cement suffices as an underfilling. However, in larger cavities and cases of extensive pulp exposure it is advisable to place a layer of phosphate cement on the hardened therapeutic dental cement in order that the pulp cap is not depressed when plugging the permanent filling. If a cast filling is planned, then the therapeutic dental cement should be covered with phosphate cement in any case. The phosphate dental cements are so designated because of the mixture of phosphoric acid and aluminum phosphate used as a hardening catalyst with a dry cement powder, such as zinc oxide.

It was found that in general, inflammations of the pulp and periodontium responded rapidly to treatment with this therapeutic dental cement. Symptoms of the condition usually disappeared and the pulp remained vital. Clinical evidence has shown that the utilization of the therapeutic dental cement is capable of achieving an effective treatment in approximately 99% of those teeth treated. This evidence should be viewed in light of the fact that for the most part the teeth which are saved, as a result of the use of the novel therapeutic dental cement, would normally have been recommended for root canal treatment or extraction in 80% of the cases.

The following examples are provided for illustrative purposes and may include particular features of the invention. However, the examples should not be construed as limiting the invention, many variations of which are possible without departing from the spirit or scope thereof.

EXAMPLE I

*Preparation of the therapeutic dental cement*

The therapeutic dental cement was prepared by first mixing 83 grams each of ground Canada balsam and rosin, N.F. The mixture was then admixed with 806 grams of zinc oxide, U.S.P., and milled through a 00 screen. Exactly 21 grams of demethylchlortetracycline hydrochloride, and 7 grams of triamcinolone acetonide were then added and the entire mixture was again milled through a 00 screen. The mixture was then barrel-rolled for approximately 30 minutes.

The hardening catalyst was prepared by adding 450 grams of turpentine oil, rectified, N.F., to 2550 grams of eugenol, U.S.P., and then agitating the mixture.

The therapeutic dental cement is prepared for application by mixing to a creamy consistency the powdered composition with 12% of the eugenol hardening catalyst, based on the weight of the dry zinc oxide powdered cement, immediately before use.

EXAMPLE II

*Utilization of the therapeutic dental cement in the treatment of carious teeth*

This example demonstrates the therapeutic effectiveness of the instant invention in the treatment of carious teeth.

A total of 484 teeth consisting of 231 molars, 167 premolars, 68 incisors and 18 deciduous teeth were treated. Under local anesthesia, all carious dentine was removed from the affected tooth, and a diagnosis was made. When the entire pulp cavity was occupied by pus, and diagnosed as total purulent pulpitis, this therapy was not effective since no pulp remains which can be restored. Of the 484 teeth treated, 65 were affected with periodontitis.

*Conditions of exposed pulp and partial purulent pulpitis*

In those cases in which the pulp was exposed or a condition of partial purulent pulpitis existed pretreatment was required. The pretreatment consisted of the application of some of the same cortico-steroid and antibacterial used in preparing the therapeutic dental cement, in the form of a hydrophilic paste with a vehicle such as a polyethylene glycol 400, to the tooth and closure of the cavity with a temporary filling. Usually within a period of two to three days the temporary filling was removed along with any excess medication.

The cement, prepared according to Example I, was then applied to the prepared cavity using a fine, long-handled plugger. The prepared cavity was completely lined with the cement, which was allowed to harden, and then permanently filled.

*Condtions of unexposed, non-purulent, serous pulpitis*

In those cases in which the pulp was not exposed, therapy of apparently non-purulent pulpitis was accomplished in one treatment. The cement, prepared according to Example I, was applied to the prepared cavity using a fine long-handled plugger. The prepared cavity was completely lined with the cement, which was allowed to harden, and then permanently filled.

In slight cavities and small areas of pulp exposure, the therapeutic dental cement suffices as an underfilling. However, in larger cavities and cases of extensive pulp exposure it is advisable to place a layer of phosphate cement on the hardened therapeutic dental cement in order that the pulp cap is not depressed when plugging the permanent filling. If a cast filling is planned, then the therapeutic dental cement should be covered with phosphate cement in any case.

It is known that the phosphate type of dental cements are made up of a dry cement powder, such as zinc oxide, and a hardening catalyst containing concentrated phosphoric acid and aluminum phosphate. The ingredients of a phosphate dental cement may be maintained separately for long periods of time, and are not to be mixed together until just before the cement is to be applied to a tooth.

Subsequent to completion of treatment all of the teeth were re-examined. The examination resulted in ascertaining that the vitality of the pulp was maintained in 98.6% of the treated teeth with a loss of 1.5%. A loss of 7 teeth out of a total of 484 teeth treated, in which more than half of the cases, the pulp was injured. Lastly, it was observed that the therapeutic dental cement renders a long lasting portection against a recurrence of infection and inflammation. Moreover, it was observed that as a result of a protection of the pulp and the nerves of the teeth treated, there was a decrease in the irritation and damage to the pulp and nerve which results from contact with the permanent filling, and thereby a concomitant decrease in the hypersensitivity of the teeth so treated.

Therefore, in conclusion, it should be noted that pursuant to the usual accepted clinical procedures, approximately 80% of the teeth would have been recommended for root canal treatment or extraction. In all cases, pain relief was evidenced in an average of 6 hours with a range of immediate relief to 24 hours. It should be pointed out that the pain relief in patients with periodontitis was usually more immediate than in patients with pulpitis.

EXAMPLE III

*Histologic verification of the effect of the therapeutic dental cement on healthy and diseased pulp*

The therapeutic dental cement was applied to a healthy, exposed pulp of a tooth to be extracted. Examination of the tissue revealed an absence of either cellular or vascular inflamation.

In cases diagnosed as serous inflamation of the pulp, the teeth which were previously treated with the therapeutic dental cement and were extracted for orthodontic reasons, were examined. In general, histologic examination revealed slight hyperemia but no cellular infiltration. The margin of the odontoblast layer was intact, but was of course missing in the area of the pulp lesion. Reparative dentine had formed in the pulpar region which was exposed to danger.

In those cases which were diagnosed as purulent inflamation of the pulp, the presence of ehalthy surrounding root pulp following application of the therapeutic dental cement was established. Histologic examination revealed vacuoles in a previously observed pulp abscess where the entire crown cavity had been filled with pus. In comparison, in older patients the remaining pulp showed reticular atrophy. Reparative dentine had formed in the pulpar region which was exposed to danger.

A strongly irritating material such as croton oil was used in two carious teeth to be extracted for orthodontic reasons. A week later one of these teeth was treated with the therapeutic dental cement, filled, and both teeth were extracted within a few days. Histologic examination revealed that the tooth treated with oil of croton alone showed complete pulp necrosis. However, the pulp of the tooth to which the therapeutic dental cement was applied was more or less normal, this in spite of the deleterious action of the oil of croton.

EXAMPLE IV

*Substitution of other tetracycline antibiotics in the therapeutic dental cement*

Compositions of the therapeutic dental cement were made, following the procedure of Example I, but substituting for demethylchlortetracycline, tetracycline in one composition, and demethyltetracycline in the other. Both of the compositions were used in the treatment of carious teeth, and exhibited the same therapeutic effectiveness as demonstrated in the foregoing examples.

Thus, it can be concluded from the foregoing description and examples that the antibiotic and cortico-steroid are evenly distributed throughout the dry zinc oxide cement powder, and the concentrations of the antibiotic and cortico-steroid are based on the weight of the dry zinc oxide cement powder.

We claim:

1. A therapeutic dental cement comprising a zinc oxide cement powder having admixed therein about 0.1 to 1% of triamcinolone acetonide and about 1.5 to 3% of a member selected from the group consisting of tetracycline, demethyltetracycline and demethylchlortetracycline, based on the weight of said powder, together with sufficient hardening catalyst to form a set cement.

2. A therapeutic dental cement comprising a zinc oxide cement powder having admixed therein about 0.1 to 1% of triamcinolone acetonide and about 1.5 to 3% of a member selected from the group consisting of tetracycline, demethyltetracycline and demethylchlortetracycline, based on the weight of said powder, together with sufficient eugenol to form a set cement.

3. A therapeutic dental cement comprising a zinc oxide cement powder having admixed therein about 0.1 to 1% of triamcinolone acetonide and about 1.5 to 3% of a member selected from the group consisting of tetracycline, demethyltetracycline and demethylchlortetracycline, based on the weight of said powder, together with sufficient hardening catalyst, containing 80 to 90 parts by weight of eugenol and 10 to 20 parts by weight of rectified oil of turpentine, to form a set cement.

4. A dry powdered cement forming mixture comprising zinc oxide, having admixed therein about 0.1 to 1% of triamcinolone acetonide and about 1.5 to 3% of a member selected from the group consisting of tetracycline, demethyltetracycline and demethylchlortetracycline, based on the weight of said zinc oxide.

5. A dry powdered cement forming mixture comprising a zinc oxide cement powder, containing 65 to 70 parts by weight of zinc oxide and 30 to 35 parts by weight of calcium hydroxide, and having admixed therein about 0.1 to 1% of triamcinolone acetonide and about 1.5 to 3% of a member selected from the group consisting of tetracycline, demethyltetracycline and demethylchlortetracycline, based on the weight of said powder.

6. A dry powdered cement forming mixture comprising a zinc oxide cement powder containing 90 to 95 parts by weight of zinc oxide and 5 to 10 parts by weight of ground Canada balsam, and having admixed therein about 0.1 to 1% of triamcinolone acetonide and about 1.5 to 3% of a member selected from the group consisting of tetracycline, demethyltetracycline and demethylchlortetracycline, based on the weight of said powder.

7. A dry powdered cement forming mixture comprising a zinc oxide cement powder containing 90 to 95 parts by weight of zinc oxide and 5 to 10 parts by weight of rosin, and having admixed therein about 0.1 to 1% of triamcinolone acetonide and about 1.5 to 3% of a member selected from the group consisting of tetracycline, demethyltetracycline and demethylchlortetracycline, based on the weight of said powder.

8. In a method for treating carious teeth, an improvement which comprises lining a prepared dental cavity with the therapeutic dental cement of claim 1, allowing the cement to harden, and then permanently filling the cavity.

References Cited by the Examiner

UNITED STATES PATENTS 2,846,322  8/1958  Buchalter _____ 106—35

OTHER REFERENCES

Accepted Dental Remedies, 1963, 28th edition, published by American Dental Association, Chicago, 1963, pages 146, 168, 169, 171.

Dental Abstracts, vol. 4, No. 5, May 1959, pages 17 and 18 (citing Baer et al., Oral Surg., Oral Med., and Oral Path., 11: 712–720, July 1958).

Dental Abstracts, vol. 4, No. 8, August 1959, page 42 (citing Skach et al., Casop. Lek. cesk., 98: 179–182, February 1959).

Dental Abstracts, vol. 7, No. 2, February 1962, pages 112–113 (citing Hiam, Deut. zahnarztl. Zschr., 16: 378–392, Feb. 15, 1961).

Dental Abstracts, vol. 8, No. 10, October 1963, pages 600–601 (citing Tomasek et al., Ceskoslov. Stomat, vol. 62, pages 337–342, October 1962).

Physicians' Desk Reference, 1961, 15th edition, published by Medical Economics, Inc., Oradell, N.J., 1960, page 753.

Dental Abstracts, vol. 6, No. 6, June 1961, page 350 (citing Meyer-Rohn, Arzneimitt, Forsch., 10: 802–804, October 1960).

LEWIS GOTTS, *Primary Examiner.*

FRANK CACCIAPAGLIA, JR., *Examiner.*

RICHARD L. HUFF, *Assistant Examiner.*